(12) United States Patent
Nabeiro

(10) Patent No.: US 11,197,575 B2
(45) Date of Patent: Dec. 14, 2021

(54) MACHINE FOR PREPARING BEVERAGES WITH BEVERAGE CONCENTRATE CARTRIDGES

(71) Applicant: NOVADELTA—COMÉRCIO E INDÚSTRIA DE CAFÉS, S.A., Lisbon (PT)

(72) Inventor: Rui Miguel Nabeiro, Campo Maior (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 429 days.

(21) Appl. No.: 16/091,607

(22) PCT Filed: Apr. 6, 2017

(86) PCT No.: PCT/PT2017/050008
§ 371 (c)(1),
(2) Date: Oct. 5, 2018

(87) PCT Pub. No.: WO2017/176137
PCT Pub. Date: Oct. 12, 2017

(65) Prior Publication Data
US 2020/0178722 A1 Jun. 11, 2020

(30) Foreign Application Priority Data
Apr. 7, 2016 (PT) .......................................... 109302

(51) Int. Cl.
*A47J 31/40* (2006.01)
*A47J 31/41* (2006.01)
(Continued)

(52) U.S. Cl.
CPC ............. *A47J 31/407* (2013.01); *A47J 31/41* (2013.01); *A47J 31/468* (2018.08); *A47J 31/52* (2013.01); *B67D 1/0051* (2013.01); *B67D 1/0079* (2013.01)

(58) Field of Classification Search
CPC .............. A47J 31/40; A47J 31/41; B67D 1/00
See application file for complete search history.

(56) References Cited

U.S. PATENT DOCUMENTS

2012/0103197 A1  5/2012  Chase et al.

FOREIGN PATENT DOCUMENTS

DE  20 2014 005 604 U1  9/2014
EP     2 447 640 A2     5/2012
(Continued)

OTHER PUBLICATIONS

International Search Report for PCT/PT2017/050008 dated Aug. 2, 2017 [PCT/ISA/210].

*Primary Examiner* — Anthony J Weier
(74) *Attorney, Agent, or Firm* — Sughrue Mion, PLLC

(57) ABSTRACT

A machine (1) for preparing beverages and presenting a plurality of beverage concentrate cartridges (2) provided to collect a respective beverage concentrate (3), and a concentrate discharge device (4) adapted so that can interact with each one of said beverage concentrate cartridges (2), whereby said beverage concentrate cartridges (2) are provided so that the beverage concentrate (3) is discharged, from the discharge part (22) of each of said beverage concentrate cartridges (2), directly to the exterior of said machine (1), in particular into a beverage recipient (A) that can be placed on the discharge zone of a service disposition (11), without touching in any other part of the machine (1). Also, a process for preparing beverages based upon the machine (1) for preparing beverages.

18 Claims, 4 Drawing Sheets

(51) Int. Cl.
    *A47J 31/52*     (2006.01)
    *A47J 31/46*     (2006.01)
    *B67D 1/00*     (2006.01)

(56) References Cited

FOREIGN PATENT DOCUMENTS

| WO | 2005/054116 A1 | 6/2005 |
|----|----------------|--------|
| WO | 2005/079361 A2 | 9/2005 |

MACHINE FOR PREPARING BEVERAGES WITH BEVERAGE CONCENTRATE CARTRIDGES

CROSS REFERENCE TO RELATED APPLICATIONS

This application is a National Stage of International Application No. PCT/PT2017/050008, filed on Apr. 6, 2017, which claims priority from Portuguese Patent Application No. 109302, filed on Apr. 7, 2016.

FIELD OF THE INVENTION

The present invention refers to the field of machines for preparing beverages based upon cartridges of a beverage concentrate.

The present invention further refers to a process for preparing beverages by means of a machine of the type of the present invention.

BACKGROUND OF THE INVENTION

The preparation of beverages, such as for example coffee, based upon the mixture of at least one beverage concentrate and at least one diluent thereof, for example water, presents several advantages. In this respect, there are known machines for preparing beverages presenting a plurality of beverage concentrate cartridges adapted for supplying a respective beverage concentrate in a process of mixture with a respective diluent.

The documents EP 2114770 B1 and EP 2114770 B1 disclose a machine of the same type, presenting a plurality of beverage concentrate cartridges corresponding to respectively different types of beverage, and whereby each one of the beverage concentrate cartridges is provided in fluid connection, by means of respective fluid conduits, with a concentrate discharge device. This type of construction results complex. Moreover, the use of mixture chambers suggests greater maintenance requirements in view of hygiene requirements, and one mixture chamber for each type of beverage, so as to prevent flavour contamination.

The document WO 2005/054116 A1 discloses another machine for preparing beverages of the same type, whereby the injectors of concentrate and diluent are provided so that the mixture is formed as a result of the collision of the respective fluxes.

The document US 2012/0103197 A1 discloses a machine for preparing beverages do the same type, including an embodiment that comprises a mobile carrousel-like support adapted for supporting a plurality of containers of different types of fluid ingredients. As fluid displacement means, said document proposes the use of a pump for pumping the fluid ingredient out of each cartridge. A reference is made to an actuation device that can be moved upwards and downwards by a positioner so as to enable that said carrousel is rotated. This actuation device does not intervene in the process of discharge of fluid ingredient out of said containers.

Moreover, there is disclosed a discharge conduit provided in the proximity, without engaging with the cartridges, and configured as relatively narrow, whereby said discharge conduit is common to the discharge of different types of fluid ingredient, so that the preparation of a type of beverage can leave vestiges thereupon and, therefore, influence the organoleptic properties of a different type of beverage being prepared afterwards.

GENERAL DESCRIPTION OF THE INVENTION

The objective of the present invention is to provide a machine for preparing beverages presenting a plurality of cartridges of beverage concentrate, in particular cartridges of concentrate corresponding to different types of beverage, and that provides greater construction simplicity, a more compact construction and providing greater operation reliability, including the possibility of preparing beverages without the risk of cross contamination of the properties of said different types of beverages.

This objective is solved according to the present invention by means of a machine for preparing beverages according to claim 1.

In particular, the machine according to the present invention is adapted so that the different beverage concentrates, provided in respective beverage concentrate cartridges inside of the machine, in particular inside of a machine casing, are discharged from respective beverage concentrate cartridge out of the machine, that is out of said machine casing, without thereby touching on any other part of the machine, such as for example a discharge conduit or similar.

Another objective of the present invention is to provide a process for preparing beverages by means of a machine for preparing beverages adapted for using a plurality of beverage concentrate cartridges.

This objective is solved according to the present invention by means of a process according to claim 15.

DESCRIPTION OF THE FIGURES

The invention shall be hereinafter explained in greater detail based upon preferred embodiments and the attached Figures.

The Figures show, in simplified schematic representations.

DESCRIPTION OF PREFERRED EMBODIMENTS OF THE INVENTION

Figure 1:
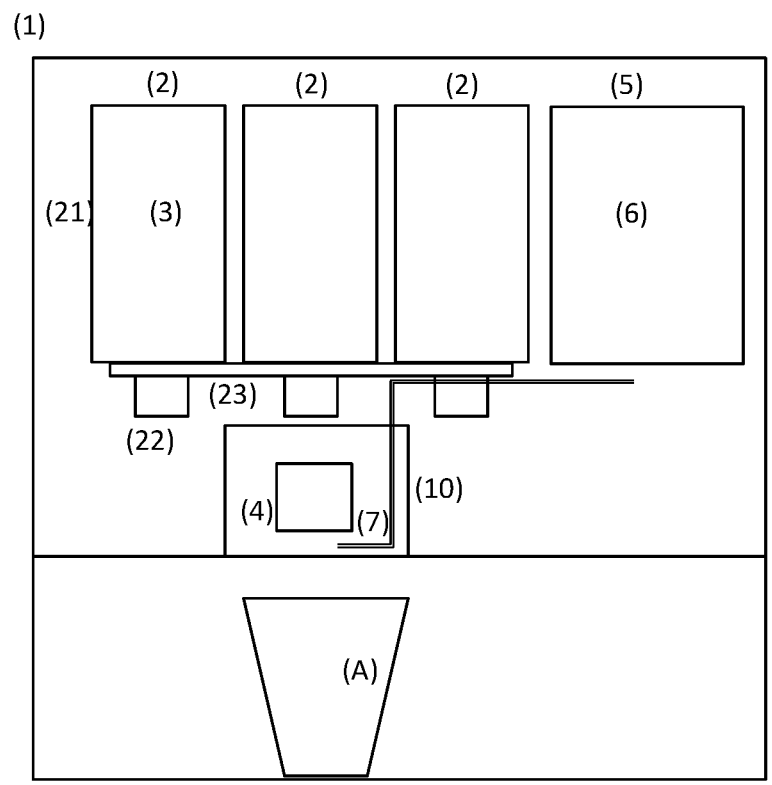
FIG. 1: front view of main functional components of a first embodiment of a machine (1) for preparing beverages according to the present invention, at a non actuated discharge position of beverage concentrate (3) into a recipient (A)
Figure 2:
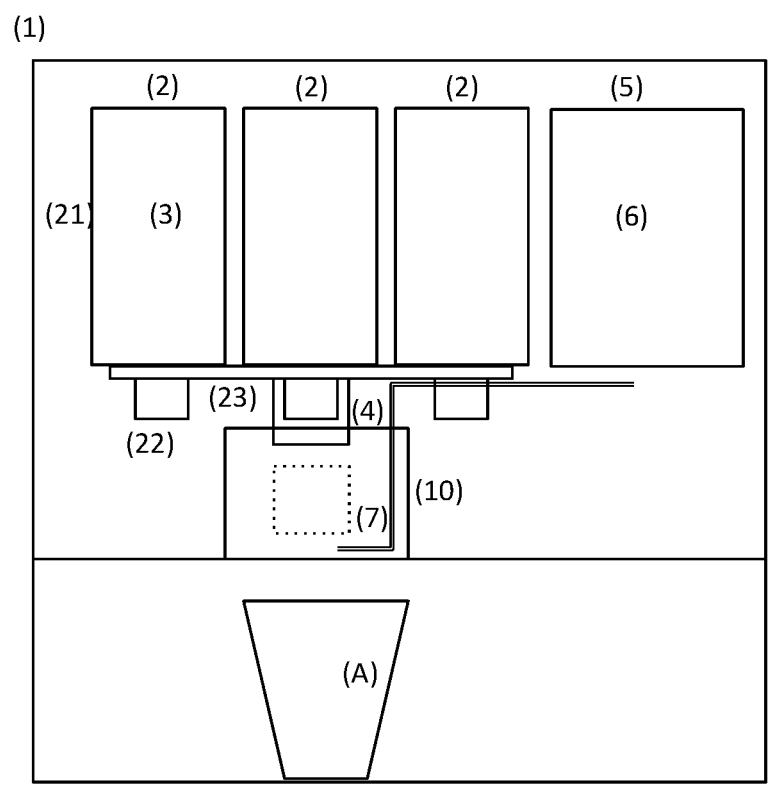
FIG. 2: front view of the first embodiment of a machine (1) for preparing beverages according to FIG. 1, at an actuated discharge position of beverage concentrate (3) into a recipient (A)

FIGS. 1 and 2 represent a first embodiment of a machine (1) for preparing beverages according to the present invention, in two different operation positions, notably in a closed position and in a discharge position, respectively.

The machine (1) for preparing beverages presents a plurality of beverage concentrate cartridges (2) comprising a recipient part (21) adapted for collecting a beverage concentrate (3), and an exit part (22) adapted for discharge of said beverage concentrate (3). Said beverage concentrate cartridges (2) are provided on a common cartridge support (23). The machine (1) for preparing beverages further comprises at least one diluent reservoir (5) adapted for collecting a diluent (6), for example water, and provided in fluid connection with a liquid discharge (7) provided downstream, at a discharge zone of the machine (1) adapted for discharge of said beverage concentrate (3) and of the diluent (6) into a beverage recipient (A).

According to an inventive aspect, said concentrate discharge device (4) and said diluent discharge (7) are adapted so that provide independent flow fluxes at least in the interior of the machine (1), and so that the flux of beverage concentrate (3) from each of said beverage concentrate cartridges (2) is discharged from a respective discharge part (22) directly out of the machine (1) without touching in any other part of the machine (1), thereby avoiding a cross contamination of flavours as a result of successive discharges of different types of beverage concentrate.

According to a preferred embodiment, each one of said beverage concentrate cartridges (2) contains a different beverage concentrate (3), that is, for example coffee of certain coffee blends, chocolate, tea or other similar substances.

Moreover, the machine (1) for preparing beverages presents a concentrate discharge device (4) adapted so that can interact with said exit part (22). In particular, said concentrate discharge device (4) is provided so that can interact with each one of said beverage concentrate cartridges (2), in such a manner that results a corresponding discharge of a preferentially previous defined quantity, of beverage concentrate (3).

It thus advantageously results that no fixed fluid connections are necessary, of a pipe type or similar, between said beverage concentrate cartridges (2) and said concentrate discharge device (4), reducing the production and maintenance costs. Moreover, it is thus possible to place different types of beverage concentrate (3) in different relative positions on the cartridge support (23) at different moments in time, given that there is no flavour contamination or other, resulting from a fixed fluid connection associated with one of said relative positions.

As one can observe, FIG. 1 shows the concentrate discharge device (4) at a first position where it does not interact with any of the beverage concentrate cartridges (2), whereas FIG. 2 schematically shows a position of interaction so as to release a discharge of a given quantity of beverage concentrate (3).

According to a preferred embodiment, said concentrate discharge device (4) is adapted so that can engage with said exit part (22) actuating the latter between a respective closed position and an open position, and vice-versa. In particular, according to an inventive aspect, said concentrate discharge device (4) is adapted so that can exert an upwards pressure upon said exit part (22), thereby actuating the latter into an open position so as to provide the discharge of a given quantity of respective beverage concentrate (3). According to another preferred embodiment, said concentrate discharge device (4) is adapted so that said beverage concentrate (3) is discharged out of a respective concentrate cartridge (2) by means of the action of the gravity force.

According to another preferred embodiment, the quantity of beverage concentrate (3) that is discharged by a beverage concentrate cartridge (2) is a function of the period of time during which said concentrate discharge device (4) drives said exit part (22) into an open position.

According to another preferred embodiment, said concentrate discharge device (4) is adapted so that said beverage concentrate (3) is discharged directly to the exterior of said machine (1) without thereby touching any material part thereof.

According to another preferred embodiment, said concentrate discharge device (4) and said diluent discharge (7) are adapted so that a flux of said beverage concentrate (3) mixes with a flux of said diluent (6) downstream of said concentrate discharge device (4), preferentially out of said machine (1). In particular, said concentrate discharge device (4) and said diluent discharge (7) are adapted so that a flux of beverage concentrate (3) mixes with a flux of diluent (6) out of said machine (1).

Figure 3:
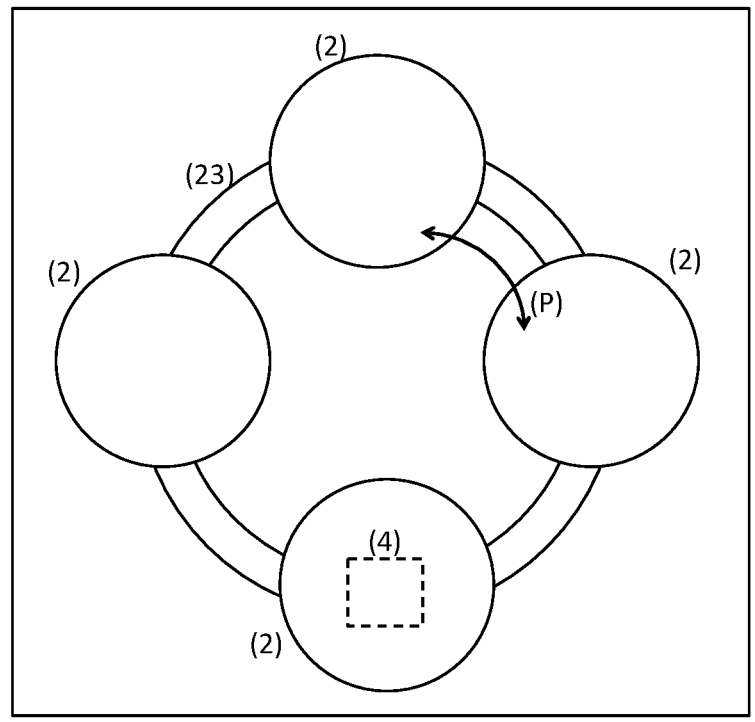
FIG. 3: top view of functional components of a second embodiment of a machine (1) for preparing beverages according to the present invention.
Figure 4:
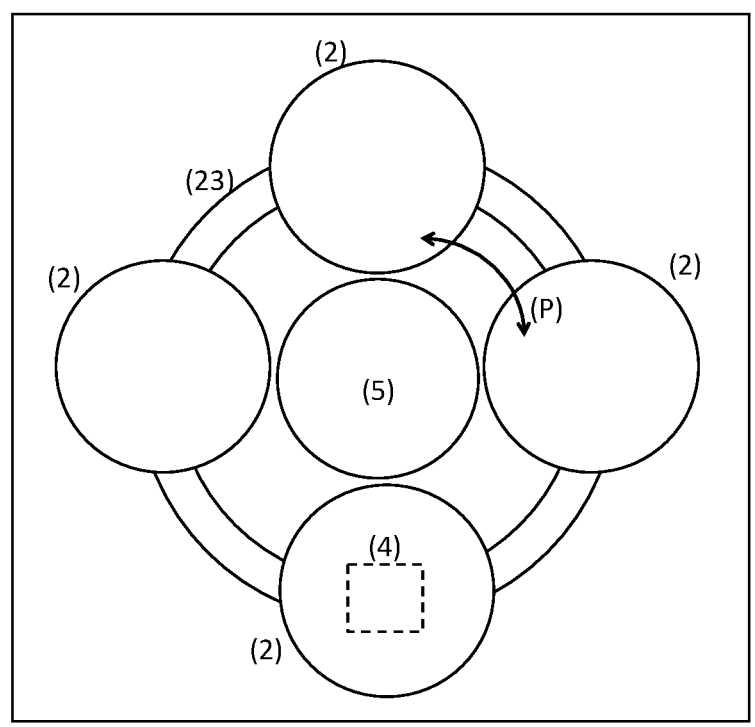
FIG. 4: top view of functional components of a third embodiment of a machine (1) for preparing beverages according to the present invention.

FIGS. 3 and 4 represent top views of second and third embodiments of a beverage preparation machine (1) according to the present invention.

Said beverage concentrate cartridges (2) are in this case provided on a mobile disposition, for example on a cartridge support (23), so that can be moved as indicated by the arrow, relative to said concentrate discharge device (4) that is provided on a fixed position, notably in the discharge zone of the machine (1). This disposition presents constructive and operational advantages relative to a disposition whereby the concentrate discharge device (4) is provided mobile and the beverage concentrate cartridges (2) are provided fixed.

According to a preferred embodiment, said beverage concentrate cartridges (2) are provided on a cartridge support (23) adapted so that can be moved and thereby make said beverage concentrate cartridges (2) circulate successively by said concentrate discharge device (4), in a closed-like circuit.

Moreover, it is preferred when said mobile cartridge support (23) is adapted so that can be actuated along in least one sense, preferentially along two opposing senses, in particular opposing rotation senses. This embodiment provides the possibility of smaller displacements of said cartridge support (23) in the case of more than four beverage concentrate cartridges (2). In particular, according to a particularly preferred embodiment, said beverage concentrate cartridges (2) are provided on a mobile cartridge support (23) in a carrousel-like form, or similar, so that each beverage concentrate cartridge (2) can pass along said concentrate discharge device (4).

According to another preferred embodiment, said beverage concentrate cartridges (2) present a container part (21) of cylindrical or prismatic-like form, and a discharge part (22) adapted so as to facilitate the flow of beverage concentrate (3). As represented, said beverage concentrate cartridges (2) are disposed on the cartridge support (23) with said exit part (22) oriented downwards.

In the case of FIG. 4, the diluent reservoir (5) is provided in the interior space of said carrousel-like arrangement, thereby further reducing the constructive dimension of the beverage preparation machine (1).

Figure 5:
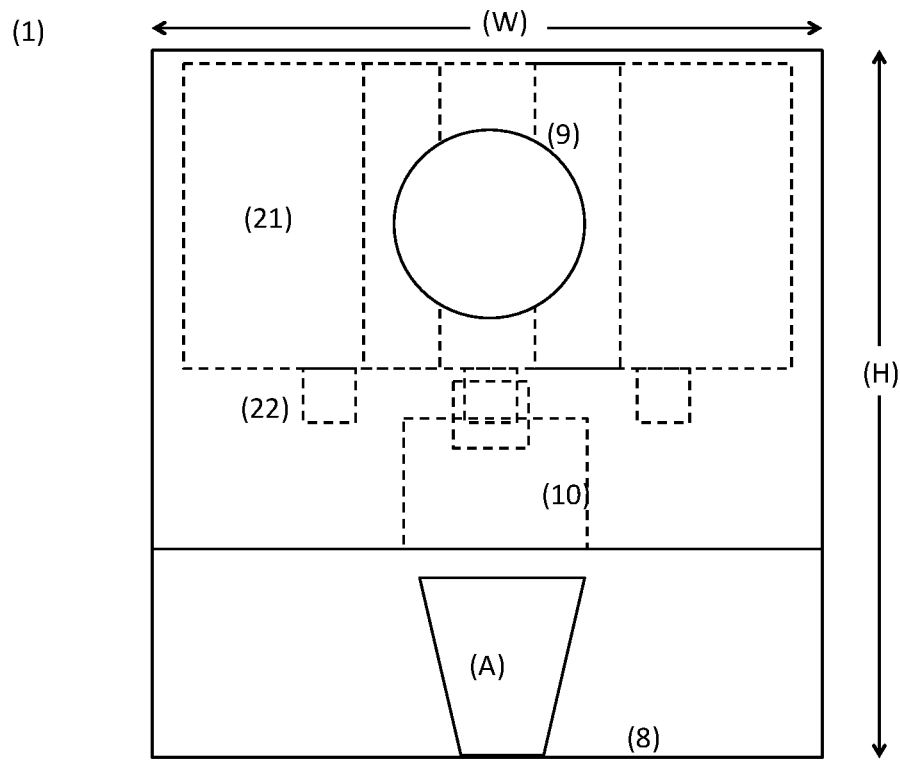
FIG. 5: front view of an embodiment of a machine (1) for preparing beverages according to FIG. 1.

FIG. 5 represents a front view of the embodiment according to FIG. 1.

The beverage preparation machine (1) presents only one zone for supporting a recipient on its front face, adapted so that can support recipients of different heights underneath the discharge zone (10) of the service disposition (8) of said machine (1), and an actuation interface (9) adapted so as to integrate all machine actuation commands relating to the preparation of a beverage.

According to another inventive aspect, a process for preparing a beverage from at least one beverage concentrate (3) and at least one diluent (6) according to the present invention on a beverage preparation machine (1) presenting a plurality of beverage concentrate cartridges (2) and a single concentrate discharge device (4), comprises the steps: selection of a type of beverage corresponding to at least one beverage concentrate (3) de contained in one of said beverage concentrate cartridges (2), interaction of said concentrate discharge device (4) with at least one of said beverage concentrate cartridges (2), discharge of a given quantity of beverage concentrate (3) to the exterior of said machine (1), and optionally discharge of a given quantity of diluent (6) to the exterior of said machine (1).

According to a preferred embodiment, the process for preparing a given beverage includes the interaction of said concentrate discharge device (4) with at least two of said beverage concentrate cartridges (2).

Figure 6:
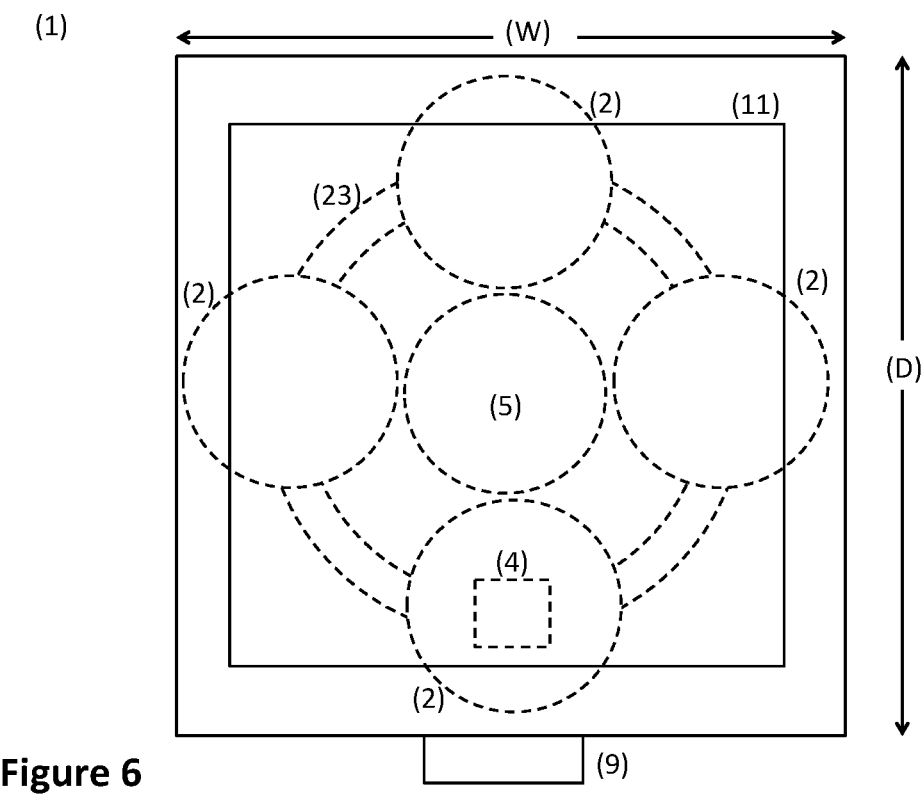
FIG. 6: perspective view of a second embodiment of a machine (1) for preparing beverages according to FIG. 1.

FIG. 6 represents a top view of a particularly preferred embodiment of the machine (1), where there is provided an access window (11) on the top face adapted so that provides access at least to all said beverage concentrate cartridges (2), preferentially also to the diluent reservoir (5). This embodiment advantageously enables an easy access by a user to said beverage concentrate cartridges (2).

Figure 7:
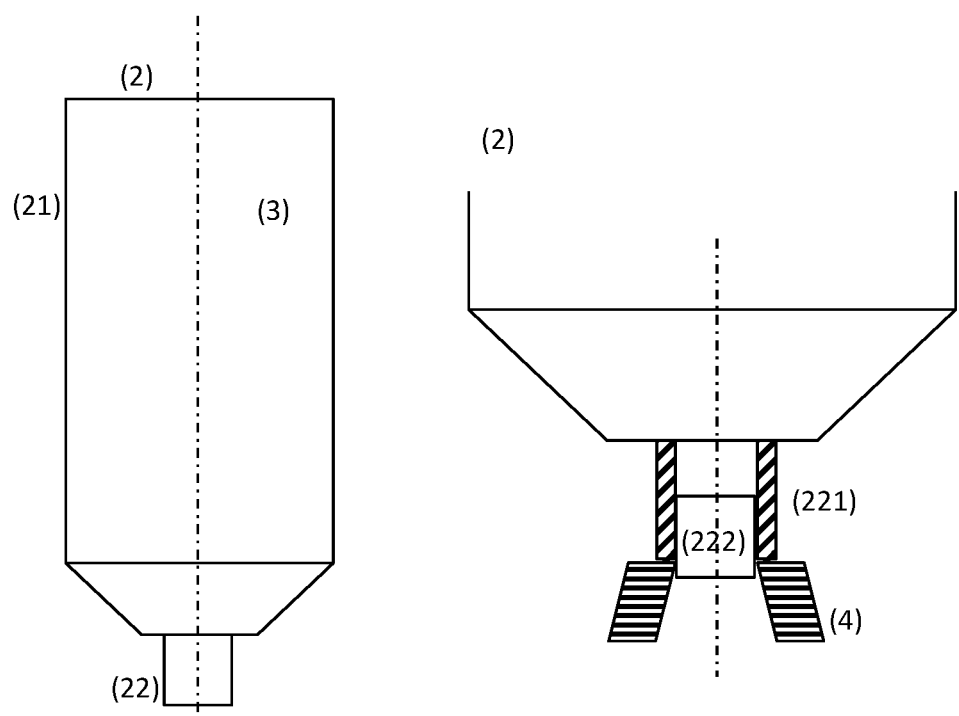
FIG. 7: side view of a beverage concentrate cartridge (2) (on the right-hand side), and detail in cut of the connection between the concentrate discharge device and the beverage concentrate cartridge (2), in a machine (1) for preparing beverages according to the invention.

FIG. 7 represents a detail of engagement of said concentrate discharge device (4) on said discharge part (22) of the beverage concentrate cartridge (2).

As represented, it is preferred when said discharge part (22) comprises an exterior part (221) and an interior part (222), and said concentrate discharge device is provided so that only actuates said exterior part (221), for example a respective base-wall, so as to displace the latter upwards relative to said interior part (222). It is herewith provided an opening and closing, and corresponding discharge of beverage concentrate (3), so that the discharge flow is discharged directly out of the do beverage concentrate cartridge (2), without the beverage concentrate (3) flowing through any physical support inside the machine (1) for preparing beverages, such as for example of the conduit type or similar.

Lisbon, May 3, 2017

The invention claimed is:
1. A machine (1) for preparing beverages comprising:
a plurality of beverage concentrate cartridges (2), each cartridge comprising a container part (21) adapted for containing a beverage concentrate (3) and a discharge part (22) adapted for discharge of said beverage concentrate (3) in a discharge direction, arranged in a cartridge support (23),
only one concentrate discharge device (4) adapted for interacting individually with said discharge part (22) of each of said beverage concentrate cartridges (2),
at least one stationary diluent reservoir (5) adapted for containing a beverage diluent (6) and in fixed fluid connection with a diluent discharge (7) provided downstream of said diluent reservoir, and
a control device provided in operational connection with said concentrate discharge device (4)) to control movement thereof,
wherein both said concentrate discharge device and said diluent discharge are coupled to a discharge zone of a service disposition of the machine,
wherein said beverage concentrate cartridges (2) present a container part (21) is of cylindrical or prismatic form, and said discharge part (22) comprises a smaller cross-section than said container part (21), and
whereby wherein said beverage concentrate cartridges (2) are disposed on said cartridge support (23) with said discharge part (22) oriented downwards, and
wherein said concentrate discharge device (4) is moveable so that said beverage concentrate (3) can be discharged, from the discharge part (22) of each of said beverage concentrate cartridge (2), directly to an exterior of said machine (1) that receives a beverage recipient (A) that can be placed aligned with the discharge zone (10) of the service disposition (8), without thereby touching any other part of said machine (1).

2. The machine (1) according to claim 1, wherein said concentrate discharge device (4) and said diluent discharge (7) are adapted to provide respective flow fluxes along independent discharge trajectories so that said flow fluxes do not mix at least inside of the machine (1), and are aligned with a discharge zone (10) provided underneath of said concentrate discharge device (4) and underneath of said discharge part (22), without thereby touching in any other part of said discharge zone (10) of the service disposition (8).

3. The machine (1) according to claim 1, wherein said concentrate discharge device (4) is provided so as to engage with a sidewall region of said discharge part (22), or with a base-wall region of said discharge part, that surrounds a flow passageway of discharge of beverage concentrate (3) out of a respective beverage concentrate cartridge (2).

4. The machine (1) according to claim 1, wherein said concentrate discharge device (4) is configured in a ring-like shape, presenting an extension along a flow prevailing direction that is smaller than twice an extension transversal to the flow prevailing direction, so that said discharge device does not provide a flow supporting conduit to the discharge of beverage concentrate (3) downstream of said discharge part (22).

5. The machine (1) according to claim 1, wherein said concentrate discharge device (4) is adapted to interact with each one of said beverage concentrate cartridges (2) by means of a forward and backward movement of said concentrate discharge device (4) along a direction that is parallel to a prevailing discharge direction, so as to actuate a respective overture and closure of said discharge part (22).

6. The machine (1) according to claim 1, wherein said concentrate discharge device (4) is adapted to be actuated to exert an upwards pressure upon an exterior part (221) of said discharge part (22), thereby displacing said exterior part (221) by a given displacement extension relative to an interior part (222) of said discharge part (22), against the contrary action of elastic means provided on said discharge part (22), from a closed position to an open position where, during a given period of time, the discharge part (22) provides flow passage to beverage concentrate (3) out of a respective beverage concentrate cartridge (2) by means of action of a gravity force, and to stop exerting said upwards pressure so that said discharge part (22) returns to said closed position, driven by elastic means provided on said discharge part (22).

7. The machine (1) according to claim 1,
wherein said concentrate discharge device (4) is provided in operational connection with said control device, so that there is provided a regulation of at least one of:
a duration of period of time and a displacement extension, in which said concentrate discharge device (4) actuates the discharge part (22) into an open position, thereby regulating a quantity of beverage concentrate (3) discharged by a beverage concentrate cartridge (2) as a function of the duration of period of time, and/or the displacement extension in which said concentrate discharge device (4) actuates the exit part (22) into an open position.

8. The machine (1) according to claim 1, wherein said beverage concentrate cartridges (2) are provided on a mobile cartridge support (23), adapted to be actuated into rotation along two opposing rotation directions, relative to said concentrate discharge device (4) that is provided on a stationary position that is vertically aligned above of said service disposition (11).

9. The machine (1) according to claim 1, wherein said beverage concentrate cartridges (2) are provided on a movable cartridge support (23) that is adapted to provide a first support for said beverage concentrate cartridges (2) on a first region in the vicinity of the discharge part (22), and a second support in at least one second region of respective container part (21), on a region in the vicinity of the distal edge relative to the discharge part (22).

10. The machine (1) according to claim 1, wherein the width (W) of the machine (1), and the depth of the machine (1), are smaller than the total width corresponding to the sum of the individual width of all of said beverage concentrate cartridges (2).

11. The machine (1) according to claim 1, wherein the frontal part of the machine (1) includes a service disposition (11) comprising a discharge region for beverage concentrate (3) and beverage diluent (6), and adapted for support of at least one beverage recipient (A), and wherein a frontal part of the machine (1) further presents a usage interface (12).

12. The machine (1) according to claim 1, further comprising a fluid compression device (8) disposed on at least one side of said cartridge support (23).

13. The machine (1) according to claim 1, wherein said diluent reservoir (5) presents a volume that is bigger than the volume of any of said beverage concentrate cartridges (2), and is provided at a central region of a circular-like arrangement of said beverage concentrate cartridges (2).

14. The machine (1) according to claim 1, wherein an access window (8) is provided on the top face and providing simultaneous access to said beverage concentrate cartridges (2) and also to said diluent reservoir (5), whereby said access window (8) is configured to provide passage to said diluent reservoir (5).

15. The machine (1) according to claim 10, wherein the width (W) of the machine (1), and the depth of the machine (1), are smaller than two thirds of the total width of said beverage concentrate cartridges (2).

16. The machine (1) according to claim 12, wherein a fluid compression device (8) comprises a hydraulic pump type.

17. The machine (1) according to claim 12, further comprising a fluid heating device (9) disposed on at least one side of said cartridge support (23).

18. The machine (1) according to claim 17, wherein said fluid heating device (9) comprises one of a boiler or thermoblock type.

* * * * *